United States Patent Office 2,964,562
Patented Dec. 13, 1960

2,964,562

WATER INSOLUBLE COLORANTS

Milton Landau, 225 E. 74th St., Jersey City, N.J.

No Drawing. Filed June 3, 1957, Ser. No. 662,973

11 Claims. (Cl. 260—578)

This invention relates to a colorant and more particularly to a green water-insoluble colorant which is soluble in organic solvents to give a solution which is brown in color.

The reaction of $\alpha$-naphthylamine and $\beta$-naphthylamine, respectively, with nitrous acid to produce the corresponding diazo compounds is well-known reaction. Further, it is known that these naphthylamines can be diazotized and coupled with phenols and other compounds to produce dyes. Thus, the well-known red dye known as Fast Red B is produced by diazotizing $\alpha$-naphthylamine and coupling it with $\beta$-naphthol disulphonic acid R.

It is an object of this invention to produce a green colorant which is insoluble in water and suitable for use as a green pigment, but which dissolves in organic solvents to produce a brown solution suitable, for example, for use as a wood stain to color wood brown, and as a brown colorant for lacquers.

Further objects of this invention and the various advantageous features of the colorant will become apparent as this description proceeds.

The colorant in accordance with this invention is produced by the reaction of nitrous acid with $\alpha$-naphthylamine or $\beta$-naphthylamine at a temperature within the range of about 30° C. to about 70° C. and heating the resulting precipitate until it turns green. I carry out the reaction of the $\alpha$-naphthylamine or the $\beta$-naphthylamine with nitrous acid in the presence of an organic solvent. The water-insoluble precipitate formed as a result of this reaction, is dark brown or brownish-black in color. To convert this brownish precipitate to the desired green colorant I separate it from the reaction mixture, for example, by filtration, wash it with water and then dry it. It is then converted to the green colorant merely by heating it to an elevated temperature within the range of about 75° C. to about 115° C.

I have been unable to determine the nature of the reaction by which this brown precipitate is converted, to the green colorant. However, I believe that the green colorant is a mixture of different compounds, since it softens over a range of temperatures rather than having a sharp melting point characteristic of a pure organic compound. Although this product appears to be a mixture of different compounds, it will be noted from the detailed examples given hereinafter that substantially the same dark green color tone and solubility characteristics are obtained by using different procedures exemplified. The product obtained using the $\alpha$-naphthylamine as a starting material and that obtained by the use of $\beta$-naphthylamine are similar in characteristics, but I find that the product obtained from $\alpha$-naphthylamine is the better product.

In reacting $\alpha$-naphthylamine or $\beta$-naphthylamine with nitrous acid to form the intermediate brownish precipitate, I may use a lower aliphatic organic acid, such as, for example, formic acid, acetic acid, or propionic acid both as a solvent for the reaction mixture and as a reactant to form nitrous acid in situ from sodium nitrite. Alternatively, I may use nitrous acid as a reagent, and utilize either a lower aliphatic acid or a lower aliphatic alcohol, such as, for example, methyl alcohol, ethyl alcohol, isopropyl alcohol, propyl alcohol, etc. as a solvent for the reaction mixture. Again, I may use a lower aliphatic alcohol as a solvent for the reaction mixture and form nitrous acid in situ from sodium nitrite by the addition of a small quantity of an aqueous solution of hydrochloric acid to the reaction mixture. Again, I may use the hydrochloride of $\beta$-naphthylamine as a starting material and form nitrous acid in situ using water as a solvent for the reaction mixture. The hydrochloride of $\alpha$-naphthylamine does not lend itself to reaction in this manner because of its limited solubility in water.

While I may react either the $\alpha$-naphthylamine or the $\beta$-naphthylamine with nitrous acid at any temperature within the range of about 30° C. to about 70° C. to obtain the intermediate brown precipitate, I have found, in general, that I prefer to use a somewhat lower temperature with the $\beta$-naphthylamine than with $\alpha$-naphthylamine. I prefer to keep the initial reaction temperature within the range of about 30° C. to about 50° C. when reacting $\beta$-naphthylamine with nitrous acid. I have found that when reacting $\alpha$-naphthylamine the optimal initial reaction temperature is 60° C., while that for $\beta$-naphthylamine is 40° C. Higher reaction temperatures tend to give gummy precipitates and increase production costs.

The dark green product in accordance with this invention is insoluble in water, in aqueous solutions of mineral acids, for example, a 10% aqueous sulfuric acid and in aqueous solutions of alkalis, for example, a 10% sodium hydroxide solution. However, it is slightly soluble in a variety of organic solvents, such as, for example, lower aliphatic alcohols, lower aliphatic acids, lower aliphatic esters, the lower ketones, glycols and both aromatic and aliphatic hydrocarbon solvents. Thus, this material is soluble in ethanol, glacial acetic acid, methyl acetate, diethylene glycol, benzol, benzine and similar organic solvents. Peculiarly enough, the solutions of this material in organic solvents are dark brown in color, rather than the dark green of its solid form.

The peculiar color characteristics of the product in accordance with this invention gives it a wide range of usefulness. It is useful as a green pigment in vehicles in which it is insoluble. Thus, it may be used as green pigment in paints, enamels, shoe polish and plastics. On the other hand, it may be used as brown colorant in vehicles in which it is soluble. It may, for example, be used as a stain for wood when a solution in, for example, benzol, benzene, ethanol or a similar volatile solvent. Again, it may be used as a brown colorant in lacquers which use esters and ketones as solvents. Despite the fact that this product is only slightly soluble in organic solvents, its high tinctorial value renders its solutions in organic solvents of definite commercial value.

The products in accordance with this invention and the method for their preparation are specifically illustrated by the following examples:

Example 1

Ten grams of technical grade $\alpha$-naphthylamine were dissolved in 20 ml. of glacial acetic acid and warmed to 60° C. A solution of sodium nitrite consisting of 6 grams of sodium nitrite dissolved in 20 ml. of water were added slowly while at room temperature with constant stirring to the naphthylamine solution. There was a rapid reaction with the formation of a brownish precipitate. After the reaction subsided, the reaction mixture was diluted with 40 ml. of water and the mixture warmed for 10 minutes at 60° C. The mixture was then filtered and the precipitate washed with warm water and dried, This precipitate was then warmed on a hot plate having a temperature of about 110° C. until it softened by incipient fusion and changed to a dark green color. When the color change was complete and the resulting product cooled to room temperature, it was permanently dark green in color. The fused product was then ground to a fine powder which was found to have a softening range of about 90° C. to about 110° C. and to be soluble in methyl acetate at room temperature to the extent of about 1 gram in 275 ml. The solution of this product was dark brown in color despite the fact that in solid form it was dark green. The product was also found to be soluble in other organic solvents, such as, for example, acetone, ethanol, glacial acetic acid, benzol, benzine, and diethylene glycol and to produce a dark brown solution in these solvents. The order of solubility in these solvents was approximately the same as that in methyl acetate. The dark green product was found to be insoluble in water, in a 10% aqueous solution of sodium hydroxide, in a 10% aqueous solution of sulfuric acid, when these aqueous solutions were at room temperature. In its solid form this product is valuable as a solid pigment and has high tinctorial value. When in solution in the organic solvents it is valuable as a colorant for lacquers and for wood stains.

*Example 2*

Ten grams of technical grade α-naphthylamine were dissolved in 20 ml. of 90% formic acid and warmed to 60° C. A solution of 6 grams of sodium nitrite in 20 ml. of water at room temperature was slowly added with constant stirring to the naphthylamine solution. There was a rapid reaction with the formation of a brownish precipitate which varied somewhat in shade of color and in its softening range from that obtained by the reaction of Example 1. After the reaction was completed the reaction mixture was diluted by the addition of 40 ml. of water and the mixture warmed for 10 minutes at 60° C. The reaction mixture was then filtered and the precipitate washed with warm water and dried. This precipitate was then warmed on a hot plate at a temperature of about 110° C. until it softened and changed to a green color. The appearance and solubilities characteristics of this final product were substantially identical with those of the final product produced by Example 1.

*Example 3*

Ten grams of technical grade α-naphthylamine were dissolved in 20 ml. of technical grade propionic acid and warmed to 60° C. A solution of 6 grams of sodium nitrite in 20 ml. of water were then slowly added at room temperature to the α-naphthylamine solution with constant stirring. These ingredients reacted rapidly with the formation of a brownish precipitate which varied in color tone somewhat from that obtained by the reaction of Examples 1 and 2. After the reaction subsided the reaction mixture was diluted by the addition of 40 ml. of water and the mixture warmed for 10 minutes at 60° C. It was then filtered, and the precipitate washed with warm water and dried. This precipitate was then warmed on a hot plate at about 110° C. until it softened and changed to a green color. The color shade of this precipitate was substantially the same as that obtained in Examples 1 and 2.

*Example 4*

Ten grams of α-naphthylamine were dissolevd in 50 ml. of denatured ethanol. Thirty ml. of a solution of 6 grams of sodium nitrite in 30 ml. of water was then added to the solution of α-naphthylamine and the solution warmed to a temperature of 60° C. Thirty-four ml. of hydrochloric acid (14 ml. of 20° Baumé HCl in 20 ml. of water) were added slowly at room temperature to this α-naphthylamine solution with constant stirring. A rapid reaction with the formation of a brownish precipitate ensued. The reaction mixture was warmed for about 5 minutes at a temperature of 60° C. and filtered. The filtrate was washed with warm water and dried. It was then placed on a hot plate at about 110° C. until it softened and turned a dark green. This dark green product had substantially the same properties as those obtained in the foregoing examples.

*Example 5*

A duplication of the conditions of reaction described by Example 4 using the same reactants, the same proportions, and the same reaction conditions, but replacing the ethanol used in that example as a solvent, with the same volume of methanol, gave a final product which was dark green in appearance and had substantially the same properties as that of Example 4.

*Example 6*

A duplication of the conditions of reaction described by Example 4 using the same reactants, the same proportions, and the same reaction conditions, but replacing the ethanol used in that example as a solvent, with the same volume isopropyl alcohol, gave me a final product which was dark green in appearance and had substantially the same properties as that of Example 4.

*Example 7*

Ten grams of β-naphthylamine were dissolved in 20 ml. of 90% formic acid and warmed to 40° C. A solution of 6 grams of sodium nitrite in 20 ml. of water was slowly added at room temperature to the β-naphthylamine solution with constant stirring. There was a rapid reaction with the formation of a brownish-black precipitate. After the reaction subsided, 40 ml. of water were added and the mixture warmed to 40° C. for 10 minutes. The precipitate was then filtered, washed with water having a temperature of 40° C. and dried. It was then placed on a hot plate at about 80° C. until the precipitate softened and turned dark green. When the conversion was complete and the fused solid cooled to room temperature, it was ground to a fine powder, which was found to have a softening point within the range of 60° C. to 90° C. It was insoluble in water, in a 10% aqueous solution of sodium hydroxide and in a 10% aqueous solution of sulphuric acid at room temperatures, but gave dark brown solutions in methyl acetate, acetone, ethanol, glacial acetic acid, benzol, benzine and diethylene glycol.

*Example 8*

A duplication of Example 7 using the same reactants, the same proportions, and the same reaction conditions, but replacing the formic acid used as a solvent in that example with the same volume of glacial acetic acid gave a product which was substantially identical with that obtained in Example 7.

*Example 9*

A duplication of Example 7 using the same reactants, the same proportion and the same reaction conditions, but replacing the formic acid used in that example as a solvent, with the same volume of propionic acid, gave a final product which was dark green in appearance and has substantially the same properties as that of Example 7.

*Example 10*

Ten grams of β-naphthylamine were dissolved in 50 ml. of denatured ethanol. A solution of 6 grams of sodium nitrite in 30 ml. of water were then added to the β-naphthylamine solution and the solution warmed to 40° C. Thirty-four ml. of dilute hydrochloric acid formed by the dilution of 14 ml. of 20° Baumé hydrochloric acid with 20 ml. of water were added slowly with constant stirring to the β-naphthylamine solution. A brownish-black precipitate resulted from the reaction. The reaction mixture was warmed for about five minutes at about 40° C. filtered, and the precipitate washed with water at 40° C. and dried. This brownish-black precipitate was then placed on a hot plate at a temperature of about 80° C. and heated until it softened and turned to dark green. When the color conversion was complete and the fused solid cooled to room temperature, it was ground to a fine powder which was found to have a softening range of about 60° C. to about 90° C. This product was dark green in color and had the same solubilities as the product of Example 7 described herein before.

Example 11

A duplication of Example 10 using the same reactants, the same proportions, and the same reaction conditions, but replacing the denatured ethanol used as a solvent in that example with the same volume of methanol gave a final reaction product which had the same appearance solubility properties as that of Example 10.

Example 12

A duplication of Example 10, using the same reactants, the same proportions, and the same reaction conditions, but replacing the ethanol used as a solvent in that example with the same volume of isopropyl alcohol gave a final reaction product which was dark green in appearance and had substantially the same properties as the product of Example 10.

Example 13

Ten grams of β-naphthylamine hydrochloride were dissolved in 120 ml. of water and warmed to a temperature of 40° C. A solution of 6 grams of sodium nitrite in 40 ml. of water were then slowly added at room temperature to the β-naphthylamine hydrochloride solution. A brownish precipitate was formed. The reaction mixture was warmed at a temperature of 40° C. for about 10 minutes and the precipitate filtered, washed, and dried. This brown precipitate was then warmed on a hot plate at about 80° C. until it softened and changed to a dark green color. After cooling this product closely resembled in appearance and solubility the product of Example 10.

It will be noted from the foregoing examples that the precipitate obtained by the reaction of the naphthylamine with nitrous acid, although always brownish in color, varied somewhat in color tone and in its oftening range depending upon the solvent used in the reaction mixture.

It will also be noted from the foregoing, that the final dark green products produced in the foregoing examples were substantially identical in color tone both as solids and when in solution in an organic solvent, and had substantially identical softening ranges and solubility characteristics, despite the observed variation in the color tone and in the softening range of the brownish intermediate product caused by the use of different solvents in the reaction mixture in which it is produced. For these reasons, it is my belief that substantially the same final product or substantially the same mixture of products is produced by the foregoing examples.

In the foregoing I have also theorized that the final green product of this invention is a mixture of compounds rather than a single organic compound, on the basis of the observed range of temperature over which it fuses. Again this theory has been advanced for the purpose of explaining the nature of the product and not by way of limitation of the invention.

The change in the color of the intermediate dark brownish precipitate to a dark green upon heating clearly indicates that the final product is a compound or mixture of compounds chemically different from the intermediate material and that the heating step has produced a true chemical reaction. This is also strongly indicated by the differences in the solubility of the brown intermediate product and the final dark green product. Thus, it will be noted from the foregoing that the final dark green product is soluble in a number of the organic solvents used as solvents in the reaction mixtures illustrated by the examples, in which the brownish intermediate product is insoluble and from which it separates by precipitation as it is formed.

While in the foregoing examples I have given specific proportions, specific conditions of reactions, and illustrated the use of different solvents and procedures for carrying out the reaction, it will be fully understood by those skilled in the art that organic solvents other than those illustrated, conditions of reactions other than those mentioned may be utilized and other changes made in carrying out the reaction and that the examples have been given solely for the purposes of illustrating and for showing the advantages of the invention and not by way of limitation of the scope of the invention which is defined by the following claims.

This application is a continuation-in-part of my copending application Serial No. 285,555 filed May 1, 1952, now abandoned.

I claim:

1. The product obtained by reacting a naphthylamine selected from the group consisting of α-naphthylamine and β-naphthylamine with nitrous acid in the absence of any other mineral acid at a temperature in the range 30° C. to 70° C. to form a brownish precipitate and heating the resulting precipitate until it turns green, said product being insoluble in water and producing a dark brown solution in methyl acetate.

2. The product obtained by dissolving a naphthylamine selected from the group consisting of α-naphthylamine and β-naphthylamine in an organic acid selected from the group consisting of formic acid, acetic acid and propionic acid, adding a solution of sodium nitrite, utilizing an initial reaction temperature within the range of 30° C. to 70° C., to produce a brownish precipitate by the reaction of the naphthylamine with nitrous acid in the absence of any other mineral acid, and heating the resulting precipitate until it turns green, said product being insoluble in water and producing a dark brown solution in methyl acetate.

3. The product obtained by dissolving α-naphthylamine in acetic acid, adding a solution of sodium nitrite, utilizing an initial reaction temperature within the range of 30° C. to 70° C. to produce a brownish precipitate by the reaction of the naphthylamine with nitrous acid in the absence of any other mineral acid and heating the resulting precipitate until it turns green, said product being insoluble in water and producing a dark brown solution in methyl acetate.

4. The product obtained by dissolving β-naphthylamine hydrochloride in water, adding a solution of sodium nitrite, utilizing an initial temperature within the range of 30° C. to 50° C. to produce a brownish-black precipitate by the reaction of the naphthylamine with nitrous acid in the absence of any other mineral acid and heating the resulting precipitate until it turns green, said product being insoluble in water and producing a dark brown solution in methyl acetate.

5. The product obtained by dissolving a naphthylamine selected from the group consisting of α-naphthylamine and β-naphthylamine in an alcohol selected from the group consisting of methyl alcohol, ethyl alcohol, isopropyl alcohol and propyl alcohol, adding nitrous acid, utilizing an initial reaction temperature within the range of 30° C. to 70° C. to produce a brownish precipitate by the reaction of the naphthylamine with nitrous acid in the absence of any other mineral acid, and heating the resulting precipitate until it turns green, said product being insoluble in water and producing a dark brown solution in methyl acetate.

6. The product obtained by dissolving α-naphthylamine in methyl alcohol, adding nitrous acid, utilizing an initial reaction temperature within the range of 30° C. to 70° C. to produce a brownish precipitate by the reaction of the naphthylamine with nitrous acid in the absence of any other mineral acid and heating the resulting precipitate until it turns green, said product being insoluble in water and producing a dark brown solution in methyl acetate.

7. The method of producing a product which comprises dissolving a naphthylamine selected from the group consisting of α-naphthylamine and β-naphthylamine in an organic acid selected from the group consisting of formic acid, acetic acid and propionic acid, adding a solution of sodium nitrite, utilizing an initial reaction temperature within the range of 30° C. to 70° C. to produce a brownish precipitate by the reaction of the naphthylamine with nitrous acid in the absence of any other mineral acid and heating the resulting precipitate until it turns green.

8. The method of producing a product which comprises dissolving α-naphthylamine in acetic acid, adding a solution of sodium nitrite, utilizing an initial reaction temperature within the range of 30° C. to 70° C. to produce a brownish precipitate, by the reaction of the naphthylamine with nitrous acid in the absence of any other mineral acid, and heating the resulting precipitate until it turns green.

9. The method of producing a product which comprises dissolving β-naphthylamine hydrochloride in water, adding a solution of sodium nitrite, utilizing an initial temperature within the range of 30° C. to 50° C. to produce a brownish-black precipitate by the reaction of the naphthylamine with nitrous acid in the absence of any other mineral acid and heating the resulting precipitate until it turns green.

10. The method of producing a product which comprises dissolving a naphthylamine selected from the group consisting of α-naphthylamine and β-naphthylamine in and alcohol selected from the group consisting of methyl alcohol, ethyl alcohol, isopropyl alcohol and propyl alcohol, adding nitrous acid, the utilizing an initial reaction temperature within the range of 30° C. to 70° C. to produce a brownish precipitate by the reaction of the naphthylamine with nitrous acid in the absence of any other mineral acid and heating the resulting precipitate until it turns green.

11. The method of producing a product which comprises dissolving α-naphthylamine in methyl alcohol, adding nitrous acid, utilizing an initial reaction temperature within the range of 30° C. to 70° C. to produce a brownish precipitate by the reaction of the naphthylamine with nitrous acid in the absence of any other mineral acid and heating the resulting precipitate until it turns green.

References Cited in the file of this patent

FOREIGN PATENTS

| | | |
|---|---|---|
| 451 of 1882 | Great Britain | Jan. 30, 1882 |
| 859 of 1863 | Great Britain | Apr. 4, 1863 |
| 151,561 | Switzerland | Mar. 1, 1932 |

OTHER REFERENCES

Earl et al.: Chem. Soc. J., 1938, pages 1954–1959.
Blangley: C.A. (1939) vol. 33, page 1713.
Fierz-David and Blangley: "Processes of Dye Chemistry," 1949, pages 246–247.
Whitmore: "Organic Chemistry," 2nd Ed., 1951, D. Van Nostrand Co. Inc., page 733.